United States Patent
Liao (10) Patent No.: US 10,484,560 B2
(45) Date of Patent: Nov. 19, 2019

(54) IMAGE CAPTURING METHOD CAPABLE OF ARRANGING A PLURALITY OF REGION IMAGES AND IMAGE CAPTURING DEVICE USING THE SAME

(71) Applicant: AVISION INC., Hsinchu (TW)

(72) Inventor: Chun-Chieh Liao, Hsinchu (TW)

(73) Assignee: AVISION INC., Hsinchu (TW)

(*) Notice: Subject to any disclaimer, the term of this patent is extended or adjusted under 35 U.S.C. 154(b) by 31 days.

(21) Appl. No.: 15/822,536

(22) Filed: Nov. 27, 2017

(65) Prior Publication Data
US 2018/0338055 A1   Nov. 22, 2018

(30) Foreign Application Priority Data
May 19, 2017   (TW) .............. 106116641 A (51) Int. Cl.
*G06K 15/00* (2006.01)
*H04N 1/00* (2006.01)
*H04N 1/387* (2006.01)

(52) U.S. Cl.
CPC ..... *H04N 1/00811* (2013.01); *H04N 1/00374* (2013.01); *H04N 1/3872* (2013.01); *H04N 1/3873* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS 9,654,666 B1* 5/2017 Snowball ............. H04N 1/393
2016/0191734 A1* 6/2016 Yu ..................... H04N 1/00748
                                                                358/450

FOREIGN PATENT DOCUMENTS

| CN | 1649377 A | 8/2005 |
| CN | 105472202 A | 4/2016 |
| EP | 0562468 A1 | 9/1993 |
| JP | H08265557 A | 10/1996 |
| TW | 463099 | 11/2001 |
| TW | 201546699 | 12/2015 |

OTHER PUBLICATIONS

Taiwan Intellectual Property Office, "Office Action", dated May 7, 2018.
State Intellectual Property Office of the People's Republic of China, "Office Action", dated Jan. 4, 2019.

* cited by examiner

*Primary Examiner* — Henok Shiferaw
(74) *Attorney, Agent, or Firm* — WPAT, PC (57) ABSTRACT

An image capturing method and an image capturing device using the same are provided. The image capturing method includes the following steps. Firstly, the image capturing device receives a paper sheet having a plurality of regions. Then, the image capturing device provides a user interface. Then, in response to an operation of a user to the user interface, an arrangement regulation of the regions is set. Then, the image capturing device captures a plurality of region images of the regions of the paper sheet. Then, the image capturing device arranges the region images according to the arrangement regulation.

17 Claims, 6 Drawing Sheets

IMAGE CAPTURING METHOD CAPABLE OF ARRANGING A PLURALITY OF REGION IMAGES AND IMAGE CAPTURING DEVICE USING THE SAME

This application claims the benefit of Taiwan application Serial No. 106116641, filed May 19, 2017, the subject matter of which is incorporated herein by reference.

BACKGROUND OF THE INVENTION

Field of the Invention

The invention relates in general to an image capturing method and an image capturing device using the same, and more particularly to an image capturing method capable of arranging a plurality of region images and an image capturing device using the same.

Description of the Related Art

A conventional image capturing device, such as a photocopier, can capture an image of a paper sheet. Let the paper sheet be exemplified by a leaflet. Since the leaflet is a paper sheet folded into a plurality of regions, the regions on a single side normally are not arranged according to a reading order. Therefore, after a paper sheet image of a paper sheet is captured, the region images of the single side are not arranged according to a reading order either, and the paper sheet image would become difficult to read. Therefore, it has become a prominent task for the industries to provide an image capturing technology to resolve the above problems.

SUMMARY OF THE INVENTION

The invention is directed to an image capturing method and an image capturing device using the same capable of resolving the generally known problems.

According to one embodiment of the invention, an image capturing method is provided. The image capturing method includes the following steps: receiving a paper sheet having a plurality of regions by an image capturing device; providing a user interface by the image capturing device; setting an arrangement regulation of the regions in response to an operation of a user to the user interface; capturing a plurality of region images of the regions of the paper sheet by the image capturing device; and arranging the region images by the image capturing device according to the arrangement regulation.

According to another embodiment of the invention, an image capturing device for receiving a paper sheet having a plurality of regions is provided. The image capturing device includes an image capturing module, a user interface and a processing unit. The processing unit is operated for: setting an arrangement regulation of the regions in response to an operation of a user to the user interface; controlling the image capturing module to capture a plurality of region images of the regions of the paper sheet; and, arranging the region images according to the arrangement regulation.

According to an alternate embodiment of the invention, an image capturing method is provided. The image capturing method includes the following steps: receiving a paper sheet having a plurality of regions by an image capturing device, wherein a fold mark is formed between every two adjacent regions; capturing a paper sheet image of the paper sheet by the image capturing device, wherein the paper sheet image has a plurality of fold mark images corresponding to the fold mark and a plurality of region images corresponding to the regions; dividing the paper sheet image into a plurality of region images by the image capturing device according to the fold mark images; setting an arrangement regulation of the region images; and arranging the region images according to the arrangement regulation.

According to another alternate embodiment of the invention, an image capturing device is provided. The image capturing device is for receiving a paper sheet having a plurality of regions, wherein a fold mark is formed between every two adjacent regions. The image capturing device includes an image capturing module, a user interface and a processing unit. The processing unit is operated for: controlling the image capturing module to capture a paper sheet image of the paper sheet, wherein the paper sheet image has a plurality of fold mark images corresponding to the fold mark and a plurality of region images corresponding to the regions; dividing the paper sheet image into a plurality of region images according to the fold mark images; setting an arrangement regulation of the region images; and arranging the region images according to the arrangement regulation.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
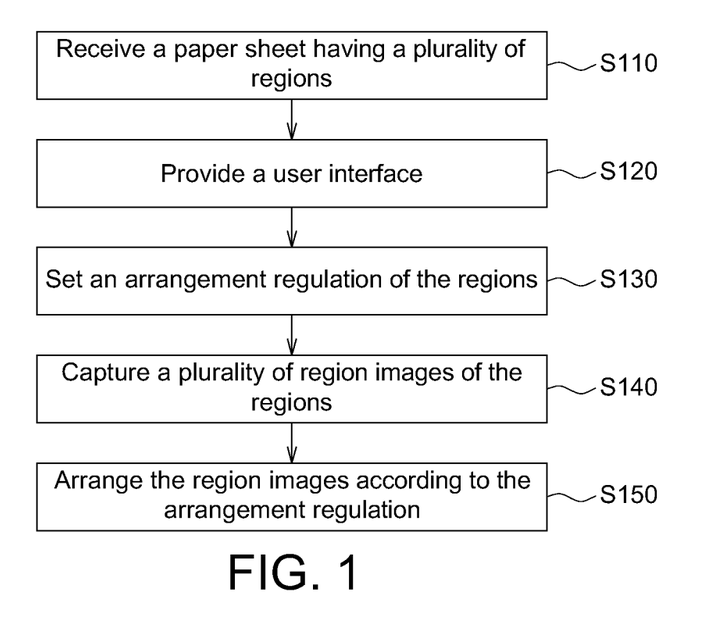
FIG. 1 is a flowchart of an image capturing method according to an embodiment of the invention.

FIG. 1 is a flowchart of an image capturing method according to an embodiment of the invention.

Figure 2:
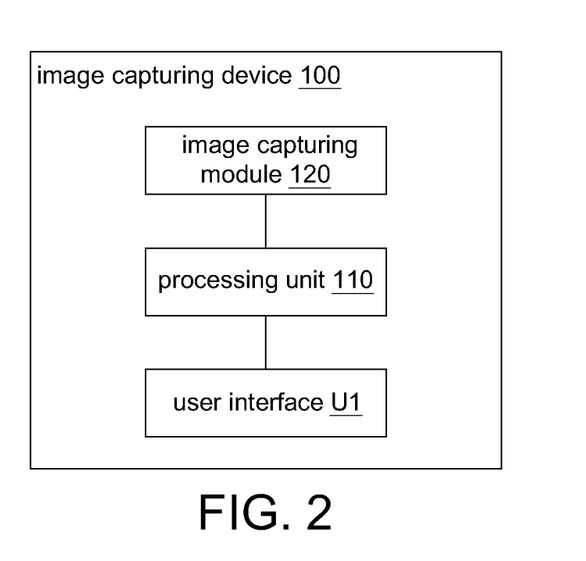
FIG. 2 is a functional block diagram of an image capturing device according to an embodiment of the invention.
Figure 3:
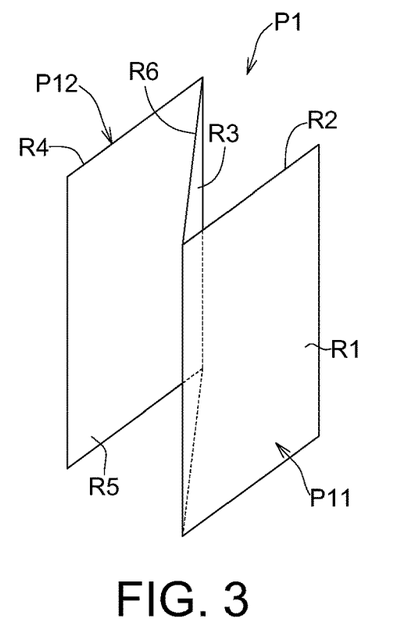
FIG. 3 is a schematic diagram of a paper sheet according to an embodiment of the invention.

In step S110, reference to FIG. 2 and FIG. 3 is made. FIG. 2 is a functional block diagram of an image capturing device 100 according to an embodiment of the invention. FIG. 3 is a schematic diagram of a paper sheet P1 according to an embodiment of the invention.

As indicated in FIG. 2, the image capturing device 100 can be realized by a photocopier, a scanner, a multifunctional machine or any other image capturing device capable of capturing a paper sheet image. The image capturing device 100 may receive a paper sheet P1. The image capturing device 100 may include a processing unit 110 and an image capturing module 120, wherein the processing unit 110 may provide a user interface U1 and control the image capturing module 120 to capture and process an image of the paper sheet P1.

As indicated in FIG. 3, the paper sheet P1 has a plurality of regions. The paper sheet P1 has a first side P11 and a second side P12 opposite to the first side P11. The first side P11 and the second side P12 have patterns, texts, symbols, lines and/or colors and are capable of displaying information. The paper sheet P1 can be realized by a leaflet or any other paper sheet capable of displaying information.

The paper sheet P1 has a plurality of regions located on the first side P11 and the second side P12 of the paper sheet P1. For example, the paper sheet P1 is a three-fold paper sheet having six regions including three first sub-regions R1, a first sub-region R5, a first sub-region R6, three second sub-regions R2, a second sub-region R3 and a second sub-region R4, wherein the first sub-regions R1, the first sub-region R5 and the first sub-region R6 are located on the first side P11; and the second sub-regions R2, the second sub-region R3 and the second sub-region R4 are located on the second side P12. In another embodiment, the paper sheet P1 can be a two-fold paper sheet, a four-fold paper sheet, or a paper sheet having other quantity of folds.

The display content in each region of the paper sheet P1 can be different from one another. The regions of the paper sheet P1 have specific arrangement relationships, such as the reading order or the connection order of patterns and/or texts. Depending on the purpose of the paper sheet P1, a plurality of regions of different paper sheets P1 may have different orders, and a plurality of continuous regions on the same side do not necessarily form a continuous reading order. As indicated in FIG. 3, the reading order for the regions of the paper sheet P1 is as follows: the first sub-region R1, the second sub-region R2, the second sub-region R3, the second sub-region R4, the first sub-region R5 and the first sub-region R6, wherein the first sub-region R1, the first sub-region R5 and the first sub-region R6 are located on the first side P11 but do not form a continuous reading relationship (for example, the first sub-regions R1 are followed by the first sub-region R5 rather than the second sub-region R2). Although a plurality of regions on the same side of the paper sheet P1 do not necessarily follow a continuous reading order, the image capturing method of the embodiments of the invention can re-arrange the captured region images to follow a reading order.

Figure 4:
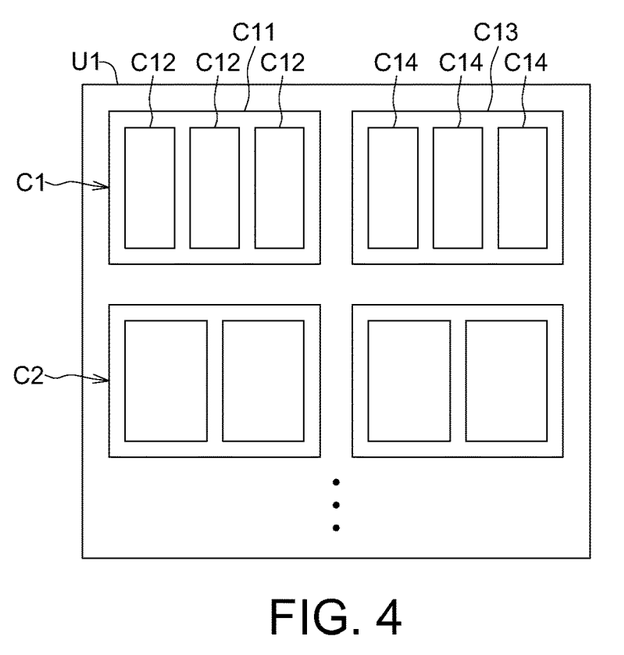
FIG. 4 is a schematic diagram of a user interface according to an embodiment of the invention.

In step S120, reference to FIG. 4 being a schematic diagram of a user interface U1 according to an embodiment of the invention is made, and the image capturing module 120 provides a user interface U1, such as a frame displayed on a touch display panel.

The user interface U1 may provide (such as display) a number of different division modalities. For example, the first division modality C1 represents that each page has three regions, and the second division modality C2 represents that each page has two regions. In other embodiments, the user interface U1 may provide more than two division modalities. The user may select a corresponding division modality through the user interface U1 according to the modality of the paper sheet P1. In the present embodiment, each page of the paper sheet P1 having three regions corresponds to the first division modality C1, so the user may select the first division modality C1 through the user interface U1.

The first division modality C1 includes a first frame C11, a plurality of first sub-frames C12, a second frame C13 and a plurality of second sub-frames C14, wherein the first sub-frames C12 are located within the first frame C11; the second sub-frames C14 are located within the second frame C13; the first sub-frames C12 and the first sub-regions of the paper sheet P1 form a correspondence relationship; the second sub-frames C14 and the second sub-regions of the paper sheet P1 form a correspondence relationship. For example, the arrangement relationship of the first sub-frames C12 in the first frame C11 is identical or similar to the arrangement relationship of the first sub-regions (such as the first sub-regions R1, the first sub-region R5 and the first sub-region R6) of the first side P11 of the paper sheet P1; the arrangement relationship of the second sub-frames C14 in the second frame C13 is identical or similar to the arrangement relationship of the second sub-regions (such as the second sub-regions R2, the second sub-region R3 and the second sub-region R4) of the second side P12.

Figure 5:
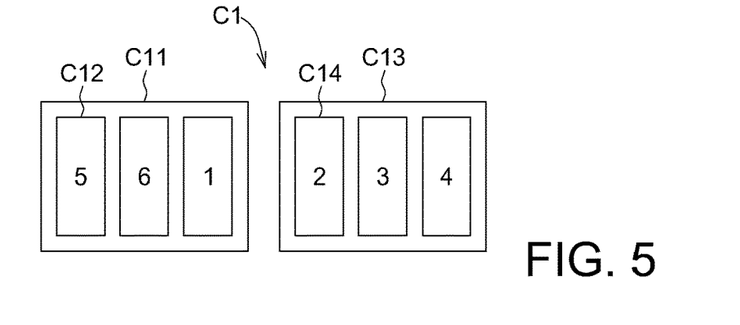
FIG. 5 is a schematic diagram of setting an arrangement regulation of the regions according to an embodiment of the invention.

In step S130, reference to FIG. 5 being a schematic diagram of setting an arrangement regulation of the regions according to an embodiment of the invention is made, and an arrangement regulation of the regions is set in response to an operation of the user to a setting instruction, wherein the setting instruction is generated from an operation of a user to the user interface U1. For example, the user may respectively input an arrangement order of a plurality of regions of the first side P11 and an arrangement order of a plurality of regions of the second side P12 to the first sub-frames C12 and the second sub-frames C14 displayed on the user interface U1. As indicated in FIG. 5, the user may respectively input a numeric sequence consisting of 5, 6 and 1 and a numeric sequence consisting of 2, 3 and 4 to the first sub-frames C12 and the second sub-frames C14 in order to determine the arrangement regulation of the regions, wherein the numeric sequence consisting of 5, 6 and 1 represents the first sub-region R5, the first sub-region R6 and the first sub-regions R1 in order, and the numeric sequence consisting of 2, 3 and 4 represents the second sub-regions R2, the third sub-region R3 and the fourth sub-region R4 in order.

In step S140, the image capturing module 120 capture a plurality of region images of the regions of the paper sheet P1. For example, the image capturing module 120 scans the first sub-region R1, the second sub-region R2, the second sub-region R3, the second sub-region R4, the first sub-region R5 and the first sub-region R6 to capture the first sub-region image M1, the second sub-region image M2, the second sub-region image M3, the second sub-region image M4, the first sub-region image M5 and the first sub-region image M6, respectively. The image capturing module 120 a plurality of region images of a plurality of regions of the paper sheet P1 in different ways at one or more than one time.

Figure 6:
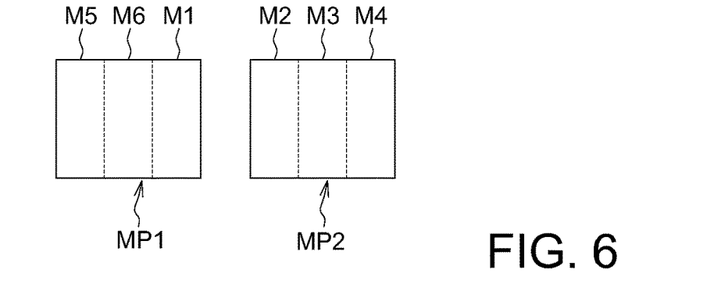
FIG. 6 is a schematic diagram on a first side image on a first side and a second side image of a second side of a paper sheet captured by an image capturing module according to an embodiment of the invention.
Figure 7:
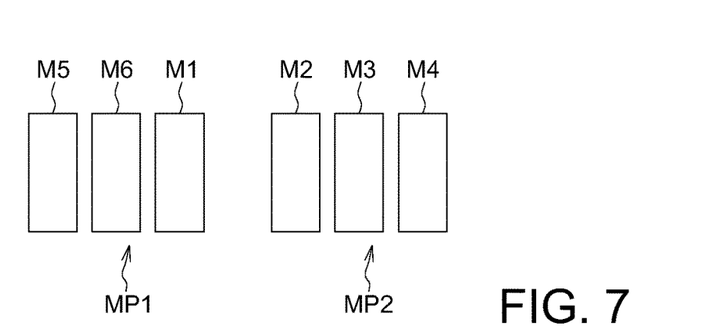
FIG. 7 is a schematic diagram on a first side image and a second side image equally divided into a plurality of region images by an image capturing device.

In an embodiment, the image capturing device 100 may capture a plurality of region images of a paper sheet P1 by way of equal division. Referring to FIG. 6, a schematic diagram on a first side image MP1 on a first side P11 and a second side image MP2 of a second side P12 of the paper sheet P1 captured by an image capturing module 120 according to an embodiment of the invention is shown. Firstly, the image capturing module 120 captures the first side image MP1 of the first side P11 and the second side image MP2 of the second side P12 of the paper sheet P1. Then as indicated in FIG. 7, the first side image MP1 and the second side image MP2 are equally divided into a plurality of region images by an image capturing device. The processing unit 110 equally divides the first side image MP1 into a first sub-region image M1, a first sub-region image M5 and a first sub-region image M6, and equally divides the second side image MP2 into a second sub-region image M2, a second sub-region image M3 and a second sub-region image M4.

According to equal division, the length of one side (such as a long side or a short side) of the first side image MP1 is divided into several segments, such that the first side image MP1 can be divided into a plurality of first sub-region images. The equal division of a plurality of second sub-region images of the second side image MP2 is similar to that of a plurality of first sub-region images of the first side image MP1, and the similarities are not repeated here. The "one side of the first side image MP1" disclosed above can be one side parallel to or perpendicular to the feed direction of paper sheets, and can be set through the user interface U1 or can be a system default setting. The feed direction is the direction in which the paper sheet P1 on the automatic feeder is fed to the image capturing device 100.

Figure 8:
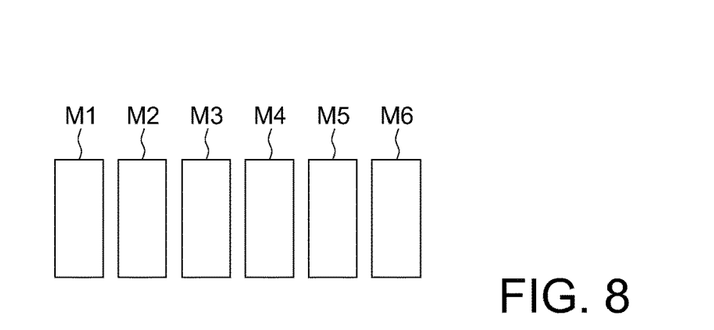
FIG. 8 is a schematic diagram of arranging region images according to an embodiment of the invention.

In step S150, reference to FIG. 8 being a schematic diagram of arranging region images according to an embodiment of the invention is made, and the processing unit 110 arranges the region images according to the arrangement regulation. For example, the processing unit 110 arranges the first sub-region image M1, the second sub-region image M2, the second sub-region image M3, the second sub-region image M4, the first sub-region image M5 and the first sub-region image M6 in order as indicated in FIG. 8 according to the arrangement regulation.

Then, the user may decide how to process the region images arranged in order according to the arrangement regulation. For example. The user may decide to print the region images on the single side or double sides of one or more than one paper sheet. Also, the region images arranged in order can be stored in one or more than one electronic file.

Refer to FIG. 2 and FIGS. 9-13. FIGS. 9-13 are process diagrams of an image capturing method according to another embodiment of the invention.

Figure 9:
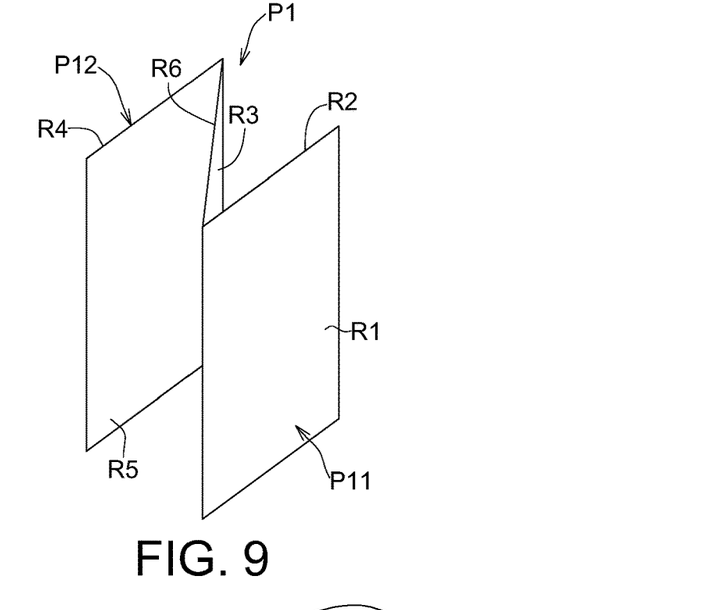
FIGS. 9~13 are process diagrams of an image capturing method according to another embodiment of the invention.

In step S110 as indicated in FIG. 9, the image capturing device 100 receives a paper sheet P1 having a plurality of regions, such as first sub-region R1, second sub-region R2, second sub-region R3, second sub-region R4 and first sub-region R5. The paper sheet P1 of FIG. 9 is different from the paper sheet P1 of FIG. 3 in that the first sub-region R6 of the paper sheet P1 of FIG. 9 is not considered. For example, the first sub-region R6 does not have information and is a blank region; or, the first sub-region R6 has information but is not considered by the user, and therefore is not included in the arrangement regulation.

Figure 10:
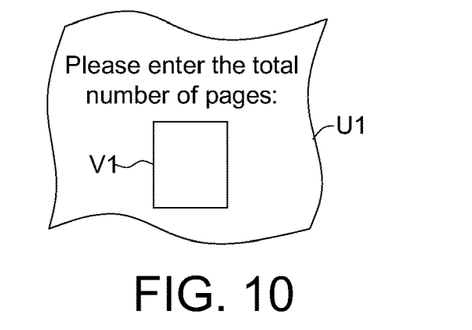

In step S120, reference to FIG. 10 being a schematic diagram of a user interface U1 according to another embodiment of the invention is made, and the user interface U1 provides a numeric field V1 to which the user inputs the quantity of regions of the paper sheet P1.

Figure 11:
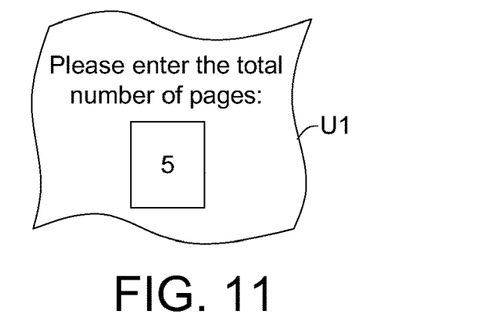

Then, as indicated in FIG. 11, an odd number is inputted to the numeric field V1 of FIG. 10. In the present embodiment, the paper sheet P1 has five regions, and therefore the user inputs "5" to the numeric field V1.

Figure 12:
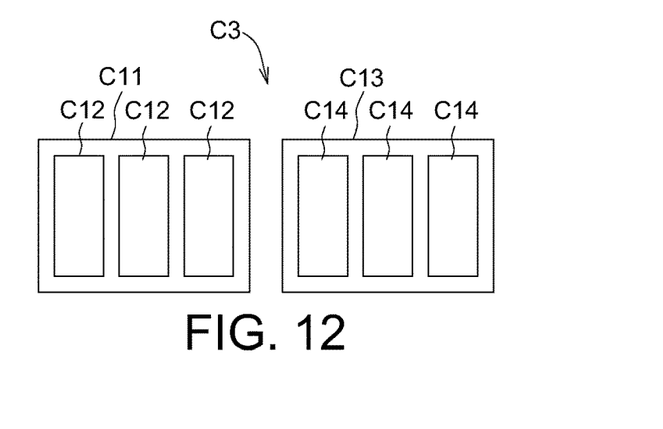

Then, reference to FIG. 12 being a schematic diagram of division modality determined according to the numeric value inputted in FIG. 11 is made. Based on formula (1), the processing unit 110 determines a quantity of single-page regions N on a single side of the paper sheet P1 according to a numeric value, such as an odd number, inputted to the numeric field V1 by the user. In formula (1), n represents the numeric value inputted to the numeric field V1.

$$N=(n+1)/2 \qquad (1)$$

Based on formula (1), the user interface U1 provides a division modality C3 including a first frame C11, a plurality of first sub-frames C12, a second frame C13 and a plurality of second sub-frames C14 as indicated in FIG. 12, wherein the first sub-frames C12 are located within the first frame C11, and the second sub-frames C14 are located within the second frame C13; and the sum of the quantity of first sub-frames C13 and the quantity of second sub-frames C14 is equivalent to the quantity of single-page regions N obtained from formula (1).

Figure 13:
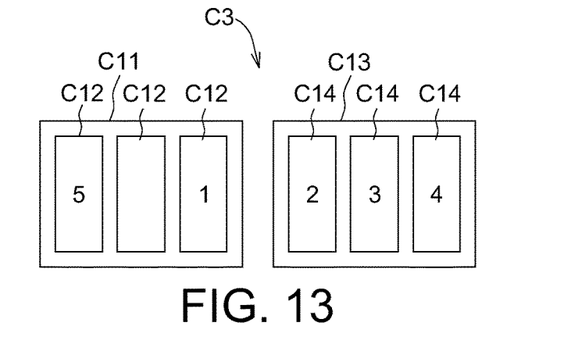

Then, in step S130 as indicated in FIG. 13, the processing unit 110 sets the arrangement regulation of the regions in response to an operation of a setting instruction generated from an operation of a user to the user interface U1.

For example as indicated in FIG. 13, the user may respectively input an arrangement order of a plurality of regions of the first side P11 and an arrangement order of a plurality of regions of the second side P12 through the first sub-frames C12 and the second sub-frames C14 provided by the user interface U1. For example, the user may input a numeric sequence consisting of 5 and 1 (the first sub-frame C12 in the middle corresponds to the sixth sub-region of the paper sheet P1 that is not considered, and therefore is not inputted) to the first sub-frames C12 in order, and may input a numeric sequence consisting of 2, 3 and 4 to the second sub-frames C14 in order to determine the arrangement regulation of the regions, wherein the numeric sequence consisting of 5 and 1 represents the first sub-region R1 and the first sub-region R5 in order; the numeric sequence consisting of 2, 3 and 4 represents the second sub-region R2, the second sub-region R3 and the second sub-region R4 in order.

In another embodiment, the user may input a numeric value different from 5, such as smaller than 5 or larger than 5, to the numeric field V1 provided by the user interface U1 as indicated in FIG. 11 according to the user's requirements for the arrangement order of the regions of the paper sheet P1 to determine the arrangement regulation of the regions.

Step S150 of the present embodiment is similar to its corresponding step S150 of FIG. 1, and the similarities are not repeated here.

Figure 14:
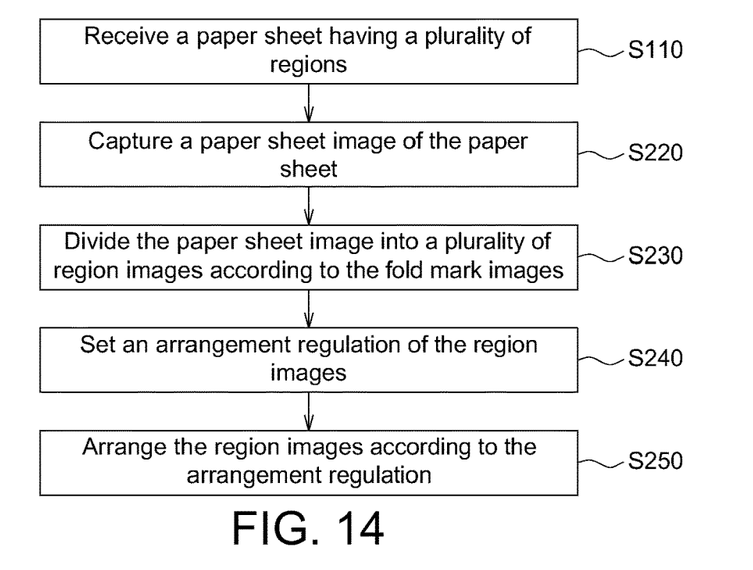
FIG. 14 is a flowchart of an image capturing method according to another embodiment of the invention.

Refer to FIG. 14 and FIGS. 15~18. FIG. 14 is a flowchart of an image capturing method according to another embodiment of the invention. FIGS. 15~18 are process diagrams of an image capturing method according to another embodiment of the invention.

Figure 15:
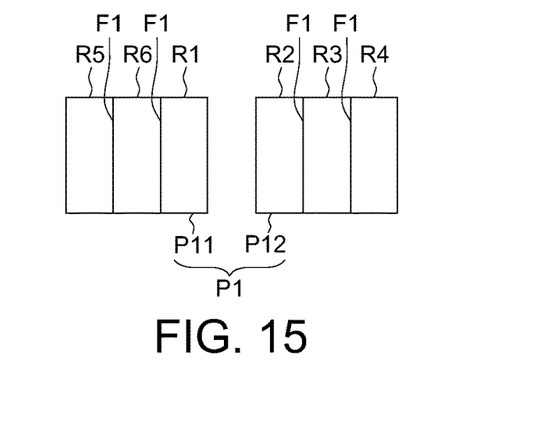
FIGS. 15~18 are process diagrams of an image capturing method according to another embodiment of the invention.

In step S210 as indicated in FIG. 15, the image capturing device 100 receives a paper sheet P1 having a plurality of regions located on the first side P11 and the second side P12 of the paper sheet P1. For example, the paper sheet P1 is a three-fold paper sheet having six regions including three first sub-regions R1, a first sub-region R5, a first sub-region R6, three second sub-regions R2, a second sub-region R3 and a second sub-region R4, wherein the first sub-regions R1, the first sub-region R5 and the first sub-region R6 are located on the first side P11; the second sub-regions R2, the second sub-region R3 and the second sub-region R4 are located on the second side P12, and a fold mark F1 is formed between every two adjacent regions.

Figure 16:
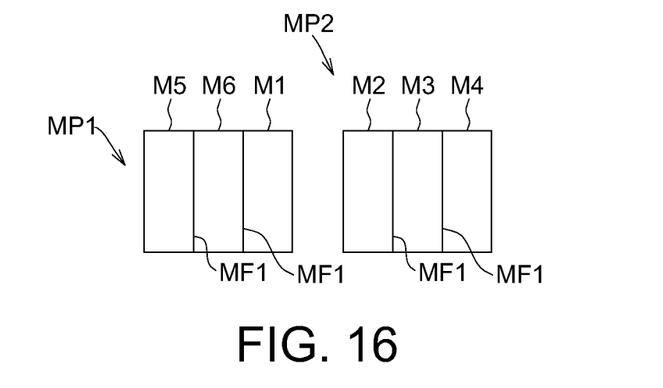

In step S220 as indicated in FIG. 16, the image capturing module 120 captures a paper sheet image of the paper sheet P1, such as a first side image MP1 of the first side P11 and a second side image MP2 of the second side P12 of the paper sheet P1. The first side image MP1 and the second side image MP2 has a plurality of fold mark images MF1 corresponding to the fold mark F1 and a plurality of region images, such as first sub-region images M1, M5 and M6 and second sub-region images M2~M4, corresponding to the regions.

Figure 17:
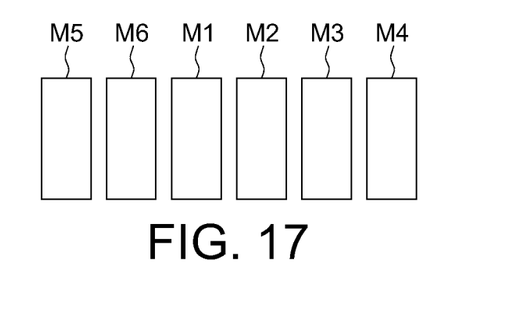

In step S230 as indicated in FIG. 17, the processing unit 110 divides the paper sheet image MP into a plurality of region images M1~M6 according to a fold mark image MF1. For example, the paper sheet image MP is divided along the fold mark image MF1 to divide the two sides of the fold mark image MF1 into two region images.

In step S240, the processing unit 110 sets an arrangement regulation of the region images M1~M6. For example, each of the regions R1~R6 of the paper sheet P1 has a page number, therefore each of the corresponding region images M1~M6 also has a page number image. The processing unit 110 can analyze the page number images to determine the arrangement regulation of the region images M1~M6. In another embodiment, the processing unit 110 may determine the arrangement regulation of the region images M1~M6 using the method disclosed in step S130 (that is, through the user interface U1). In other embodiments, the user interface U1 may provide a numeric field (similar to the numeric field V1 of FIG. 10) to which a numeric sequence is inputted. The user interface U1 may assign the first numeric value of the numeric sequence (representing the arrangement order) to the first region image M5 of FIG. 17 and assign the second numeric value (representing the arrangement order) to the second region image M6 of FIG. 17, and the rest can be obtained by the same analogy. For example, after the user inputs a numeric sequence consisting of 5, 6, 1, 2, 3 and 4 to the numeric field in order, the processing unit 110 will set the first sub-region images M5, M6 and M1 and the second sub-region images M2, M3 and M4 as page 5, page 6, page 1, page 2, page 3, and page 4, respectively.

Figure 18:
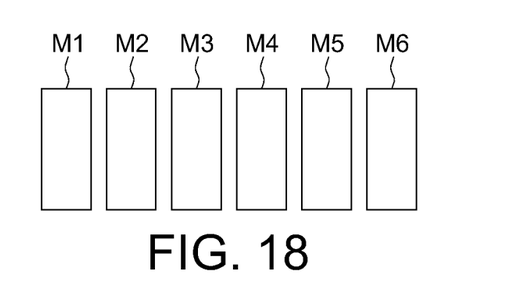

In step S250 as indicated in FIG. 18, the processing unit 110 arranges the region images according to the arrangement regulation. Since the region images M1~M6 are already divided in step S240, what are arranged in step S250 are divided region images M1~M6.

Then, the user may decide how to process the region images arranged according to the arrangement regulation. For example, the user may decide to print the region images on the single side or double sides of one or more than one paper sheet. Also, the region images arranged in order can be stored in one or more than one electronic file.

While the invention has been described by way of example and in terms of the preferred embodiment (s), it is to be understood that the invention is not limited thereto. On the contrary, it is intended to cover various modification and similar arrangements and procedures, and the scope of the appended claims therefore should be accorded the broadest interpretation so as to encompass all such modification and similar arrangements and procedures.

What is claimed is:

1. An image capturing method, comprising:
   receiving a paper sheet having a plurality of regions by an image capturing device;
   providing a user interface by the image capturing device, wherein there is a fold mark formed between every two adjacent regions, and the paper sheet has a plurality of the fold marks;
   setting an arrangement regulation of the regions in response to an operation of a user to the user interface;
   capturing a plurality of region images of the regions of the paper sheet by the image capturing device; and
   arranging the region images by the image capturing device according to the arrangement regulation.

2. The image capturing method according to claim 1, wherein in the step of receiving the paper sheet by the image capturing device, the paper sheet has a first side and a second side opposite to the first side, and the regions comprise a plurality of first sub-regions located on the first side and a plurality of second sub-regions located on the second side.

3. The image capturing method according to claim 2, wherein the user interface provides a first frame, a plurality of first sub-frame located within the first frame, a second frame and a plurality of second sub-frame located within the second frame, the first sub-frames and the first sub-regions form a correspondence relationship, and the second sub-frames and the second sub-regions form a correspondence relationship; the step of setting the arrangement regulation of the regions comprises:
   setting the arrangement regulation of the region images according to an arrangement order of the first sub-frames and an arrangement order of the second sub-frames set by the user.

4. The image capturing method according to claim 1, wherein the user interface provides a numeric field; the step of setting the arrangement regulation of the regions comprises:
   determining a quantity of single-page regions on a single side of the paper sheet according to an odd number inputted to the numeric field by the user;
   providing a first frame, a plurality of first sub-frame, a second frame and a plurality of second sub-frame by the user interface according to the quantity of single-page regions, wherein the sum of the quantity of first sub-frames and the quantity of second sub-frames is equivalent to the quantity of single-page regions.

5. The image capturing method according to claim 2, wherein the user interface provides a numeric field; the step of setting the arrangement regulation of the regions comprises:
   determining the arrangement regulation according to a numeric sequence inputted to the numeric field by the user.

6. An image capturing device for receiving a paper sheet having a plurality of regions, wherein there is a fold mark formed between every two adjacent regions, and the paper sheet has a plurality of the fold marks, and the image capturing device comprises:
   an image capturing module;
   a user interface; and
   a processing unit operated for:
   setting an arrangement regulation of the regions in response to an operation of a user to the user interface;
   controlling the image capturing module to capture a plurality of region images of the regions of the paper sheet; and
   arranging the region images according to the arrangement regulation.

7. The image capturing device according to claim 6, wherein the paper sheet has a first side and a second side opposite to the first side, and the regions comprise a plurality of first sub-regions located on the first side and a plurality of second sub-regions located on the second side.

8. The image capturing device according to claim 7, wherein the user interface provides a first frame, a plurality of first sub-frame located within the first frame, a second frame and a plurality of second sub-frame located within the second frame, the first sub-frames and the first sub-regions form a correspondence relationship, and the second sub-frames and the second sub-regions form a correspondence relationship; the processing unit is operated for:

setting the arrangement regulation of the region images according to an arrangement order of the first sub-frames and an arrangement order of the second sub-frames set by the user.

9. The image capturing device according to claim 6, wherein the user interface provides a numeric field; the processing unit is operated for:
  determining a quantity of single-page regions on a single side of the paper sheet according to an odd number inputted to the numeric field by the user; and
  providing a first frame, a plurality of first sub-frame, a second frame and a plurality of second sub-frame by the user interface according to the quantity of single-page regions, wherein the sum of the quantity of first sub-frames and the quantity of second sub-frames is equivalent to the quantity of single-page regions.

10. The image capturing device according to claim 7, wherein the user interface provides a numeric field; the processing unit is operated for:
  determining the arrangement regulation according to a numeric sequence inputted to the numeric field by the user.

11. An image capturing method, comprising:
  receiving a paper sheet having a plurality of regions by an image capturing device, wherein there is a fold mark formed between every two adjacent regions, and the paper sheet has a plurality of the fold marks;
  capturing a paper sheet image of the paper sheet by the image capturing device, wherein the paper sheet image has a plurality of fold mark images corresponding to the fold marks and a plurality of region images corresponding to the regions;
  dividing the paper sheet image into a plurality of region images by the image capturing device according to the fold mark images;
  setting an arrangement regulation of the region images; and
  arranging the region images according to the arrangement regulation.

12. An image capturing device for receiving a paper sheet having a plurality of regions, wherein there is a fold mark formed between every two adjacent regions, and the paper sheet has a plurality of the fold marks, and the image capturing device comprises:
  an image capturing module;
  a user interface; and
  a processing unit operated for:
    controlling the image capturing module to capture a paper sheet image of the paper sheet, wherein the paper sheet image has a plurality of fold mark images corresponding to the fold marks and a plurality of region images corresponding to the regions; dividing the paper sheet image into a plurality of region images according to the fold mark images;
    setting an arrangement regulation of the region images; and
    arranging the region images according to the arrangement regulation.

13. An image capturing method, comprising:
  receiving a paper sheet having a plurality of regions by an image capturing device;
  providing a user interface by the image capturing device, wherein the paper sheet is unfolded, and there is a fold mark formed between every two adjacent regions, and the paper sheet has a plurality of the fold marks;
  setting an arrangement regulation of the regions in response to an operation of a user to the user interface;
  capturing a plurality of region images of the regions of the paper sheet by the image capturing device; and
  arranging the region images by the image capturing device according to the arrangement regulation.

14. The image capturing method according to claim 13, wherein in the step of receiving the paper sheet by the image capturing device, the paper sheet has a first side and a second side opposite to the first side, and the regions comprise a plurality of first sub-regions located on the first side and a plurality of second sub-regions located on the second side.

15. The image capturing method according to claim 14, wherein the user interface provides a first frame, a plurality of first sub-frame located within the first frame, a second frame and a plurality of second sub-frame located within the second frame, the first sub-frames and the first sub-regions form a correspondence relationship, and the second sub-frames and the second sub-regions form a correspondence relationship; the step of setting the arrangement regulation of the regions comprises:
  setting the arrangement regulation of the region images according to an arrangement order of the first sub-frames and an arrangement order of the second sub-frames set by the user.

16. The image capturing method according to claim 13, wherein the user interface provides a numeric field; the step of setting the arrangement regulation of the regions comprises:
  determining a quantity of single-page regions on a single side of the paper sheet according to an odd number inputted to the numeric field by the user;
  providing a first frame, a plurality of first sub-frame, a second frame and a plurality of second sub-frame by the user interface according to the quantity of single-page regions, wherein the sum of the quantity of first sub-frames and the quantity of second sub-frames is equivalent to the quantity of single-page regions.

17. The image capturing method according to claim 14, wherein the user interface provides a numeric field; the step of setting the arrangement regulation of the regions comprises:
  determining the arrangement regulation according to a numeric sequence inputted to the numeric field by the user.

* * * * *